United States Patent
Sada et al.

(10) Patent No.: US 6,350,509 B1
(45) Date of Patent: *Feb. 26, 2002

(54) COATING STRUCTURE

(75) Inventors: Toshihiko Sada; Masahiko Yamanaka, both of Kanagawa; Hiroshi Tabata, Yokohama; Kinya Kumazawa, Kanagawa; Hidekazu Takahashi, Yokohama, all of (JP)

(73) Assignees: Nissan Motor Co., Ltd., Yokahama; Tanaka Kikinzoku Kogyo K.K., Tokyo; Teijin Limited, Osaka, all of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/458,655

(22) Filed: Dec. 10, 1999

(30) Foreign Application Priority Data

Dec. 10, 1998 (JP) ............................................ 10-350985
Dec. 3, 1999 (JP) ............................................ 11-344228

(51) Int. Cl.⁷ ............................... B32B 7/02; G02B 5/23
(52) U.S. Cl. ...................... 428/212; 252/586; 349/110; 359/580; 106/415; 106/418
(58) Field of Search .................... 428/212; 252/586; 349/110; 359/580; 106/415, 418

(56) References Cited

U.S. PATENT DOCUMENTS

| | | | |
|---|---|---|---|
| 3,711,176 A | 1/1973 | Alfrey, Jr. et al. | 350/1 |
| 4,017,326 A | * 4/1977 | Davis | 106/291 |
| 4,499,143 A | * 2/1985 | Panush | 428/336 |
| 4,514,459 A | 4/1985 | Nakagawa et al. | 428/229 |

(List continued on next page.)

FOREIGN PATENT DOCUMENTS

| | | |
|---|---|---|
| EP | 0 736 076 B1 | * 12/1993 |
| EP | 0 926 272 | 6/1999 |
| JP | 43-14185 | 6/1966 |
| JP | 59-228042 | 12/1984 |
| JP | 60-24847 | 6/1985 |
| JP | 62-170510 | 7/1987 |
| JP | 63-120642 | 5/1988 |
| JP | 63-64535 | 12/1988 |
| JP | 1-139803 | 6/1989 |

(List continued on next page.)

OTHER PUBLICATIONS

Fumio Yoshimoto et al., "Depth Perception and Accomodation", 5ᵗʰ Syposium on Human Interface, (Oct. 25–27, 1989), Kyoto pp 175–178.

* cited by examiner

*Primary Examiner*—Cynthia H. Kelly
*Assistant Examiner*—Kimberly T. Nguyen
(74) *Attorney, Agent, or Firm*—Foley & Lardner (57) ABSTRACT

A coating structure includes a color base, a first coating layer placed on the color base, and transparent brilliant members contained in the first coating layer, each brilliant member including an alternate lamination of at least two polymers having different refractive indexes and controlling interference light resulting from reflection and interference produced by the alternate lamination and transmitted light other than interference light. The coating structure is provided with a coloring mechanism for producing at least an interference color resulting from reflection and interference of an incident source spectrum produced by the brilliant members, a first object color resulting from direct action of the spectrum with the color base, and a second object color resulting from action of the spectrum transmitting through the brilliant members with the color base. Mixing of the three colors causes a hue varying with the angle.

15 Claims, 8 Drawing Sheets

| DESIG-NATION | | BRILLIANT MEMBERS | | | NUMBER OF COATING LAYERS (CLEAR LAYERS IN PARENTHESES) | RESULTS OF EVALUATIONS | | | | |
|---|---|---|---|---|---|---|---|---|---|---|
| | | DIMENSIONAL RATIO | | CONTENT (wt%) | | CHANGE IN COLOR | ADHESION | DEPTH | PROFUN-DITY | BRILL-IANCY |
| | | A | B | L | | | | | | | |
| EXAMPLES | 1 | 1 | 4~5 | 15~20 | 10 | 1 | BLUE → VIOLET | 100/100 | ○ | ○ | ○ |
| | 2 | 1 | 4~5 | 15~20 | 10 | 2(1) | BLUE → VIOLET | 100/100 | ○ | ○ | ◎ |
| | 3 | 1 | 4~5 | 15~20 25~35 | 10 | 2 | BLUE → VIOLET | 100/100 | ◎ | ○ | ○ |
| | 4 | 1 | 4~5 | 15~20 25~35 | 10 | 3(1) | BLUE → VIOLET | 100/100 | ◎ | ○ | ◎ |
| | 5 | 1 | 4~5 | 15~20 25~35 | 10 | 3(1) | BLUE → VIOLET | 100/100 | ◎ | ○ | ○ |
| | 6 | 1 | 4~5 | 15~20 25~35 | 10 | 4(2) | BLUE → VIOLET | 100/100 | ◎ | ○ | ◎ |
| | 7 | 1 | 2~3 | 15~20 | 10 | 1 | BLUE → VIOLET | 100/100 | ○ | ○ | ○ |
| | 8 | 1 | 4~5 | 1~3 | 10 | 1 | BLUE → VIOLET | 100/100 | ○ | ○ | ○ |
| | 9 | 1 | 4~5 | 15~20 | 1 | 1 | BLUE → VIOLET | 100/100 | ○ | ○ | ○ |
| | 10 | 1 | 4~5 | 15~20 | 28 | 2(1) | BLUE → VIOLET | 100/100 | ○ | ○ | ◎ |
| | 11 | 1 | 4~5 | 10~15 | 15 | 2(1) | BLUE → VIOLET | 100/100 | ◎ | ○ | ◎ |
| | 12 | 1 | 4~5 | 10~15 | 15 | 2(1) | GREEN → VIOLET | 100/100 | ○ | ○ | ○ |
| | 13 | 1 | 4~5 | 10~15 25~30 | 15 | 4(2) | GREEN → VIOLET | 100/100 | ◎ | ◎ | ◎ |
| COMPARATIVE EXAMPLES | 1 | — | — | — | — | 2(1) | RED | 100/100 | × | × | ◎ |
| | 2 | — | — | — | — | 2(1) | SILVER | 100/100 | × | × | ◎ |
| | 3 | — | — | — | — | 2(1) | WHITE | 100/100 | × | △ | ◎ |

U.S. PATENT DOCUMENTS

| | | | |
|---|---|---|---|
| 4,595,634 A | | 6/1986 | Gordon ........................ 428/428 |
| 5,049,442 A | * | 9/1991 | Panush ........................ 428/328 |
| 5,238,492 A | * | 8/1993 | Itoh et al. .................... 106/436 |
| 5,407,738 A | | 4/1995 | Tabata et al. ................ 428/229 |
| 5,472,798 A | | 12/1995 | Kumazawa et al. ......... 428/690 |
| 5,569,535 A | * | 10/1996 | Phillips et al. ............... 428/403 |
| 5,612,095 A | * | 3/1997 | Brock et al. .............. 427/407.1 |
| 5,626,661 A | * | 5/1997 | Schmid et al. ............... 406/415 |
| 5,667,892 A | * | 9/1997 | Marillier ...................... 428/403 |
| 5,766,335 A | * | 6/1998 | Bujard et al. ................ 406/404 |
| 5,834,064 A | * | 11/1998 | Dietz et al. ............... 427/388.1 |
| 5,849,365 A | * | 12/1998 | Topfel et al. ................ 427/421 |
| 5,849,383 A | | 12/1998 | Kumazawa et al. ........... 428/38 |
| 5,871,827 A | * | 2/1999 | Jaffe et al. .................... 428/29 |
| 5,912,283 A | * | 6/1999 | Hashizume et al. ......... 523/213 |
| 5,958,125 A | * | 9/1999 | Schmid et al. ............... 106/417 |
| 6,132,504 A | * | 10/2000 | Kuntz et al. ................. 106/404 |
| 6,132,873 A | * | 10/2000 | Dietz et al. .................. 428/404 |
| 6,139,614 A | * | 10/2000 | Schmid et al. ............... 106/417 |
| 6,143,379 A | * | 11/2000 | Schoenfeld et al. .......... 428/1.1 |
| 6,150,022 A | * | 11/2000 | Coulter et al. ............... 428/403 |
| 6,157,489 A | * | 12/2000 | Bradley, Jr. et al. ........ 359/584 |

FOREIGN PATENT DOCUMENTS

| | | |
|---|---|---|
| JP | 4-202805 | 7/1992 |
| JP | 6-17349 | 1/1994 |
| JP | 7-34320 | 2/1995 |
| JP | 7-34324 | 2/1995 |
| JP | 7-97766 | 4/1995 |
| JP | 7-97786 | 4/1995 |
| JP | 7-166430 | 6/1995 |
| JP | 7-195603 | 8/1995 |
| JP | 7-331532 | 12/1995 |

| DESIG-NATION | | BRILLIANT MEMBERS | | | | NUMBER OF COATING LAYERS (CLEAR LAYERS IN PARENTHESES) | RESULTS OF EVALUATIONS | | | | |
|---|---|---|---|---|---|---|---|---|---|---|---|
| | | DIMENSIONAL RATIO | | | CONTENT (wt%) | | CHANGE IN COLOR | ADHESION | DEPTH | PROFUN-DITY | BRILL-IANCY |
| | | A | B | L | | | | | | | |
| EXAMPLES | 1 | 1 | 4~5 | 15~20 | 10 | 1 | BLUE → VIOLET | 100/100 | ○ | ○ | ○ |
| | 2 | 1 | 4~5 | 15~20 | 10 | 2(1) | BLUE → VIOLET | 100/100 | ○ | ○ | ◎ |
| | 3 | 1 | 4~5 | 15~20 / 25~35 | 10 | 2 | BLUE → VIOLET | 100/100 | ◎ | ○ | ○ |
| | 4 | 1 | 4~5 | 15~20 | 10 | 3(1) | BLUE → VIOLET | 100/100 | ◎ | ○ | ◎ |
| | 5 | 1 | 4~5 | 15~20 / 25~35 | 10 | 3(1) | BLUE → VIOLET | 100/100 | ◎ | ○ | ○ |
| | 6 | 1 | 4~5 | 15~20 / 25~35 | 10 | 4(2) | BLUE → VIOLET | 100/100 | ◎ | ○ | ◎ |
| | 7 | 1 | 2~3 | 15~20 | 10 | 1 | BLUE → VIOLET | 100/100 | ○ | ○ | ○ |
| | 8 | 1 | 4~5 | 1~3 | 10 | 1 | BLUE → VIOLET | 100/100 | ○ | ○ | ◎ |
| | 9 | 1 | 4~5 | 15~20 | 1 | 1 | BLUE → VIOLET | 100/100 | ○ | ○ | ○ |
| | 10 | 1 | 4~5 | 15~20 | 28 | 2(1) | BLUE → VIOLET | 100/100 | ○ | ○ | ◎ |
| | 11 | 1 | 4~5 | 10~15 | 15 | 2(1) | BLUE → VIOLET | 100/100 | ○ | ○ | ◎ |
| | 12 | 1 | 4~5 | 10~15 | 15 | 2(1) | GREEN → VIOLET | 100/100 | ○ | ○ | ○ |
| | 13 | 1 | 4~5 | 10~15 / 25~30 | 15 | 4(2) | GREEN → VIOLET | 100/100 | ◎ | ◎ | ◎ |
| COMPARATIVE EXAMPLES | 1 | — | — | — | — | 2(1) | RED | 100/100 | × | × | ◎ |
| | 2 | — | — | — | — | 2(1) | SILVER | 100/100 | × | × | ◎ |
| | 3 | — | — | — | — | 2(1) | WHITE | 100/100 | × | △ | ◎ |

COATING STRUCTURE

BACKGROUND OF THE INVENTION

The present invention relates to a coating structure applied on the surfaces of vehicles such as a car, a ship and a plane, a furniture, electric appliances, sporting goods, etc. More particularly, the present invention relates to a coating structure having a visual quality with brilliancy, hue varying with the angle, depth and profundity, and producing different tone from a color base that forms a lower layer of a coating film due to coloring interaction therewith.

By way of example, final coating for motor vehicles is generally in the form of a solid-color, metallic-color or peal-color film.

The solid-color film produces a predetermined tint by a color pigment. The metallic-color film contains a color pigment and fine aluminum pieces to provide not only a color of the color pigment, but a design quality with sparkle due, to irregular reflection of light produced by the aluminum pieces. The pearl-color film includes a color-base film and a transparent mica-base paint containing mica pieces applied thereon to provide not only sparkle like the metallic-color film generated under the action of light reflected by a mica-base film and light reflected by the color-base film, but softer reflected light than that of the metallic color film due to interference by the mica pieces. Recently, the use of special mica allows creation of a design quality with iridescence having a hue varying with the angle.

SUMMARY OF THE INVENTION

As described above, there is a wide diversity of the design quality of coating for motor vehicles in recent years. Under such circumstances, the development of new paints and coating technique is demanded to enable a coating structure with novel design quality that is different from the metallic-color and pearl-color films.

It is, therefore, an object of the present invention to provide a coating structure having not only a visual quality with high brilliancy, hue varying with the angle, depth and profundity, but novel design and ornamental qualities different from the earlier art.

One aspect of the present invention lies in providing a coating structure, comprising:

a color base;

a first coating layer placed on said color base; and transparent brilliant members contained in said first coating layer, each brilliant member including an alternate lamination of at least two polymers having different refractive indexes, each brilliant member controlling interference light resulting from reflection and interference produced by said alternate lamination and transmitted light other than said interference light, whereby the coating structure is provided with a coloring mechanism for producing at least an interference color resulting from reflection and interference of an incident source spectrum produced by sale brilliant members, a first object color resulting from direct action of said spectrum with said color base, and a send object color resulting from action of said spectrum transmitting through said brilliant members with said color base, mixing of said colors providing a hue varying with an angle.

Another aspect of the present invention lies in providing a coating structure, comprising:

a color base:

first and second layers placed on said color base, said first layer being adjacent to said color base; and first and second transparent brilliant members contained in said first and second layers, each brilliant member including an alternate lamination of at least two polymers having different refractive indexes, each brilliant member controlling interference light resulting from reflection and interference produced by said alternate lamination and transmitted light other than said interference light, said second brilliant members being greater in length than said first brilliant members, whereby the coating structure is provided with a coloring mechanism for producing at least an interference color resulting from reflection and interference of an incident source spectrum produced by said first and second brilliant members, a first object color resulting from direct action of said spectrum with said color base, and a second object color resulting from action of said spectrum transmitting through said first and second brilliant members with said color base, mixing of said colors providing a hue varying with an angle.

DETAILED DESCRIPTION OF THE INVENTION

Figure 1A:
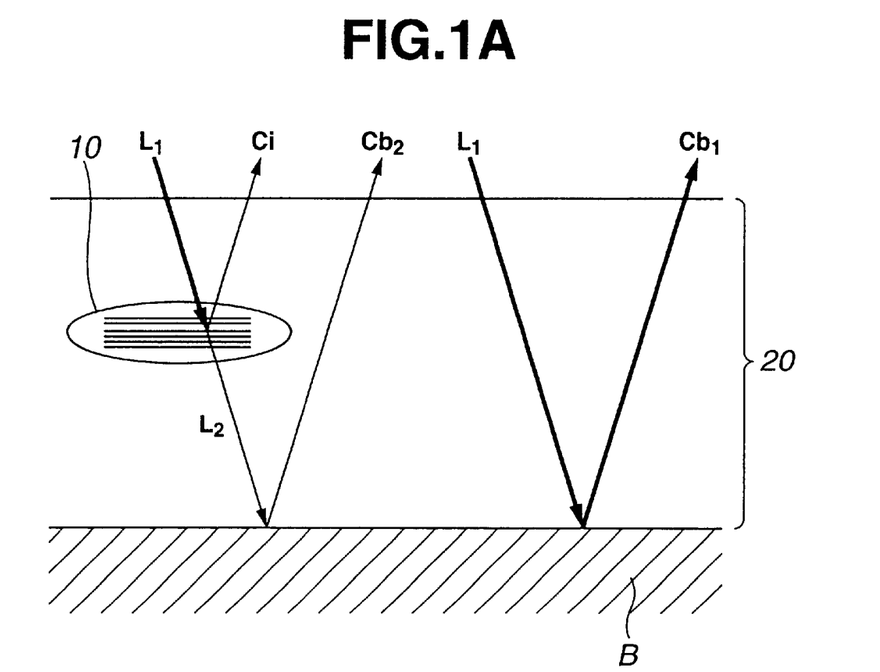
FIG. 1A is a schematic drawing showing an inventive coating structure containing a transparent brilliant member and a coloring mechanism thereof.

Referring to FIG. 1A, an inventive coating structure includes a color base B and a coating layer 20 placed thereon and containing a predetermined concentration of transparent brilliant members 10. Each brilliant member 10 includes an alternate or regularly repeated lamination of at least two polymer having different refractive indexes as will be described later, and it controls interference light resulting from reflection and interference produced by the lamination and transmitted light other than interference light. The coating structure produced at least an interference color Ci resulting from reflection and interference of light or incident source spectrum L1 produced by the brilliant members 10 dispersed therein, a first object color Cb1 resulting from direct action of the spectrum L1 with the color base B, and a second object color Cb2 resulting from action of light or source spectrum L2 transmitting through the brilliant members 10 with the color base B. Mixing of the three colors Ci, Cb1, Cb2 causes a hue varying with the angle.

With a known pearl-mica pigment. In order to maximize the hiding power, semitransparent or non-transparent mica as a base material is coated with titanium dioxide or the like, which is often covered with a metallic layer. The semitransparent pearl-mica pigment absorbs or reflects part of incident light, and emits the remainder as transmitted light, which is low both in intensity and in purity. On the other hand, the non transparent pearl-mica pigment absorbs or reflects most of incident light, and emits little transmitted light, resulting in higher hiding power but in lower level of the interference color. It is noted that the smaller is the hiding power of the pearl-mica pigment, the greater is the quantity of light transmitting therethrough.

The inventive transparent brilliant member 10 does not aim to increase the hiding power by coating a semitransparent or non-transparent base material with titanium dioxide, but to minimize it. The brilliant member 10 includes an alternate lamination of at least two transparent polymers, and makes full use of both coloring due to reflection and interference of light (interference color) and coloring due to transmission of light other than reflection and interference thereof (transmission color) to improve the design and ornamental qualities.

The light L1 incident on the brilliant member 10 travels generally in two separate optical paths. One part of the light L1 enters the alternate lamination of the brilliant member 10 to produce the interference color Ci resulting from reflection and interference of light. Another part of the light L1 transmits through the brilliant member 10 due to the fact that the brilliant member 10 is a transparent body, forming the transmitted light L2 of high purity. Action of the two parts of the light L1 plays an important role in providing a novel coating structure having a visual quality with high brilliancy, hue varying with the angle, profundity and transparency.

When seeing the coating layer 20 placed on the color base B and containing the brilliant members 10 from the incident side of the source spectrum L1, we perceive the strong interference color Ci resulting from reflection and interference of the spectrum L1 produced by the brilliant members 10, the first object color Cb1 resulting from direct action of the spectrum L1 with the color base B, and the second object color Cb2 resulting from action of the spectrum L2 transmitting through the brilliant members 10 with the color base B when no stray-light absorbing layer as will be described later is arranged in each brilliant member 10 for full absorption of transmitted light. Mixing of the colors Ci, Cb1, Cb2 provides a heretofore-unknown peculiar visual quality with transparent hue, high brilliancy and profundity, for example. Moreover, interference of light resulting from the alternate lamination of the brilliant member 10 causes a hue varying with the angle. In actuality, in addition to coloring due to those source spectrums L1, L2, there exists coloring due to light outgoing via complex paths made by repetition of reflection and interference produced by several brilliant members 10 and reflection produced by the color base B, which contributes to a complex hue change. The interference color Ci and the first and second object colors Cb1, Cb2 play a dominant role in a hue change, while as being attenuated every reflection, interference and transmission, outgoing light play a relatively small role therein.

The color base B constitutes a base of the coating layer 20, including a surface of a desired color including white, gray or black. Generally, the color base B is obtained by applying an undercoat of a predetermined color on the surface of a work to be coated. However, the color base B is not limited to a coating film, and may be a surface of a work itself if the color thereof is available without applying an undercoat, which is a case of resin and metallic materials, for example.

The brilliant member 10 not only produces interference and transmitted lights, but controls them with respect to the transmission color other than the interference color. It is noted that the alternate lamination of the brilliant member 10 can produce a strong interference color, having also a strong transmission color. The above control includes an arbitrary change in intensity or transmittance and peak wavelength of interference and transmitted lights, and concerns a kind of conversion of light intensity and wavelength. This becomes more remarkable by the measures depicted, for example, in claim 4, wherein the alternate lamination of the brilliant member 10 includes a layer containing an achromatic or chromatic coloring matter.

Moreover, when the brilliant member 10 contains no coloring matter, the source spectrum L1 is reflected by and interfered with the brilliant member 10 to produce a very transparent tone peculiar to the interference color, and the transmitted light L2 other than interference light also produces a transparent tone corresponding to a complementary color of the interference color Ci, providing a peculiar composite color due to interaction with the color base B as will be described later.

Figure 1B:
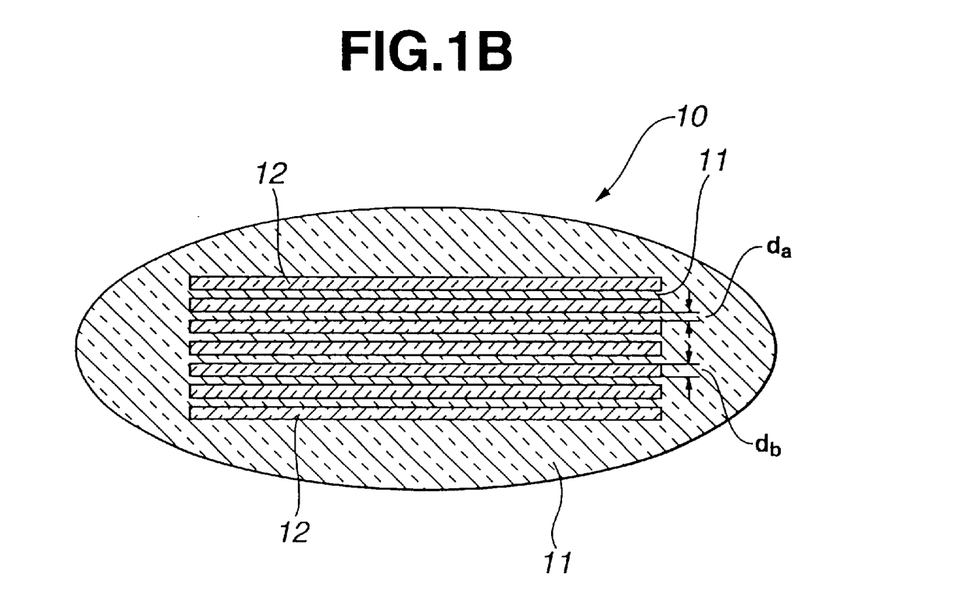
FIG. 1B is an enlarged section showing the brilliant member.

Referring to FIG. 1B, the brilliant member to has a section as shown in FIG. 1B, including therein an alternate lamination of two polymers 11, 12, for example. Suppose that the refractive indexes of the polymers 11, 12 are na and nb, and that the thicknesses of the two are da and db. In order to obtain a desired coloring or an interference color of wavelength $\lambda 1$, the following conditions should be satisfied. When $na \geq 1.3$, and $1.01 \leq nb/na \leq 1.40$, a primary reflection peak wavelength $\lambda 1$ is given by $\lambda 1 = 2(nada + nbdb)$.

Determination of the primary reflection peak wavelength $\lambda 1$ to satisfy such conditions allows not only generation of hues covering all color ranges of violet-green-red, but achievement of the very strong interference color Ci.

Among the above conditions, the condition of $na \geq 1.3$ results from the material characteristics of the polymers 11, 12. The condition of $1.01 \leq nb/na$ results from the practical manufacturing condition with respect to formation of the alternate lamination of two polymers and the really visually recognizable level of tone in the region of visible light. And the condition of $nb/na \leq 1.40$ also results from the manufacturing condition with respect to formation of the alternate lamination of two polymers. In particular, when the optical thicknesses (=refractive index×thickness) of two polymer layers are the same, i.e. nada=nbdb, the greatest reflectance R is obtained.

The polymers 11, 12 of the brilliant member 10 may be resins including polyester, polyacrylonitrile, polystyrene, nylon, polypropylene, polyvinyl alcohol, polycarbonate, polyethylene naphthalate, polyethylene terephthalate, polymethyl, methylacrylate, polyether etherketone, polyparaphenylene, polymethyl methacrylate, polyether etherketone, polyparaphenylene terephthal amide, polyphenylene sulfide, etc., or copolymer resins thereof, among which two resins with different refractive indexes are selected for application. Although the number of alternate polymer layers of the brilliant member 10 is not limited to a specific number, it is, preferably, 5 or more, particularly, 10 to 150. It is noted that when applying three polymers or more, the repeated lamination of the polymers is needed in a predetermined order and without changing the order.

The method of manufacturing the brilliant members 10 including such alternate lamination may be selected from physical depositions such as vacuum or electron deposition, ion plating and molecular beam epitaxy, treating methods such as casting, spin coat, plasma polymerization and Langmuir-Blodgett technique, and spinning methods such as melt, wet and dry spinnings. Moreover, a continuous structure may be used, which is manufactured by a melt composite spinning device with a special spinneret for forming the alternate lamination. The continuous coloring structure is subjected to a drawing treatment, if required, to obtain a desired section, then cut to a predetermined length for application.

With the inventive coating structure, a binder and a topcoat clear paint for the coating layer 20 containing the brilliant members 10 are, preferably, resins with transparency including coating-film forming polymers may be acrylic, alkyd, polyester, polyurethane, and amino resins. A hardener may be alkoxymethylolmelamine resin, isocyanate or block isocyanate compound, polyacid anhydride, and polyepoxy resin. A solvent for dissolving or diffusing the polymers and the hardener also serves as a paint, which may be toluenen, xylone, butyl acetate, methyl acetate, methyl ethyl ketone, methyl isobutyl ketone, butyl alcohol, aliphatic hydrocarbon, and aromatic hydrocarbon. Moreover, water can serve as a solventless paint. There is no particular limitation on the paint.

With the inventive coating structure, the brilliant member 10 may contain not only a known pigment such as pearl-mica or organic or inorganic pigment concurrently, but a previously applied additive agent such as dispersing agent, plasticizer or surface regulator. However, adding of the organic or inorganic pigment is, preferably, avoided due to possible occurrence of muddiness or cloudiness of a hue.

The reason why the inventive coating structure produces a transparent hue, high brilliancy and profundity is not fully evident at present, but can be presumed as follows:

Referring to FIG. 1A, the light or source spectrum L1 incident on the brilliant member 10 contained in the coating layer 20 produces coloring due to reflection and interference or the interference color Ci. Light other than interference light is transmitted through the brilliant member 10 to form the transmitted light or source spectrum L2, which strikes the color base B. The transmitted light L2 is a remainder of the spectrum L1 with the interference color Ci removed, having a phase controlled and a very high purity like interference light. The transmitted light L2 is partly absorbed by the color base B, but mostly reflected thereby for emission from the coating layer 20, providing the second object color Cb2. Likewise, the light or spectrum L1 directly incident on the color base B without transmuting through the brilliant member 10 is partly absorbed by the color base B, but mostly reflected thereby for emission from the coating layer 20, providing the first object color Cb1.

In such a way, the inventive coating structure produces lights outgoing via substantially three paths, i.e. the interference color Ci, the first object color Cb1, and the second object color Cb2. Visual recognition with respect to a hue is ensured by synthesis of the above three lights or by trigger light when an excitative value of one of the lights, e.g. the interference light Ci, is extremely great. The interference color produced optically has a very higher reflectance and a greater excitative value than those of the object color, enabling easier generation of sparkle.

With the inventive coating structure, as depicted, for example, in claim 4, the alternate lamination of the brilliant member 10 can include a layer containing an achromatic or chromatic coloring matter, resulting in further controlled intensity or transmittance and wavelength of light transmitting through the brilliant member 10. It is noted that, the achromatic colors are colors without hue but with only lightness of the three attributes of the color (hue, lightness, and saturation) including white, gray and black. On the other hand, the chromatic colors are colors other than the achromatic colors and with the three attributes of the color.

Figure 2:
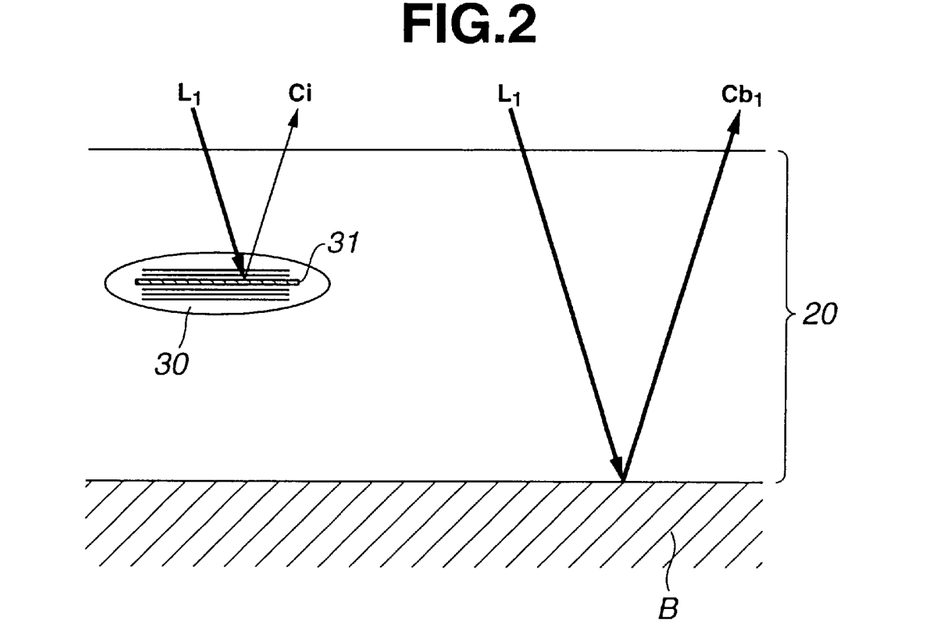
FIG. 2 is a view similar to FIG. 1A, showing the coloring mechanism when the brilliant member includes a layer containing a black pigment.

FIG. 2 shows the coating structure and a coloring mechanism thereof, the coating structure including the coating layer 20 containing transparent brilliant members 30 each with a stray-light absorbing layer 31 including an achromatic pigment or a black pigment for absorbing 100% transmitted light. The incident light L1 is partly reflected by the brilliant member 30, which forms interference light, providing the interference color Ci. Light other than interference light is all absorbed by the stray-light absorbing layer 31. The light L1 directly incident on the color base B is partly absorbed with respect to tight of a predetermined wavelength by the achromatic pigment of the color base B, but mostly reflected thereby, providing the object color Cb1. Generally, we perceive an additive mixture of the two colors, which is slightly influenced by synthesis of interference lights produced by the brilliant member 30.

Specifically, the stray-light absorbing layer 31 arranged in the alternate lamination of the brilliant member 30 serves to shut off most of the light L2 that will transmit through the brilliant member 30, obtaining the enhanced interference color Ci. This results in achievement of more mysterious tone and visual quality than those of the brilliant member 30 with no stray-light absorbing layer 31.

Figure 3:
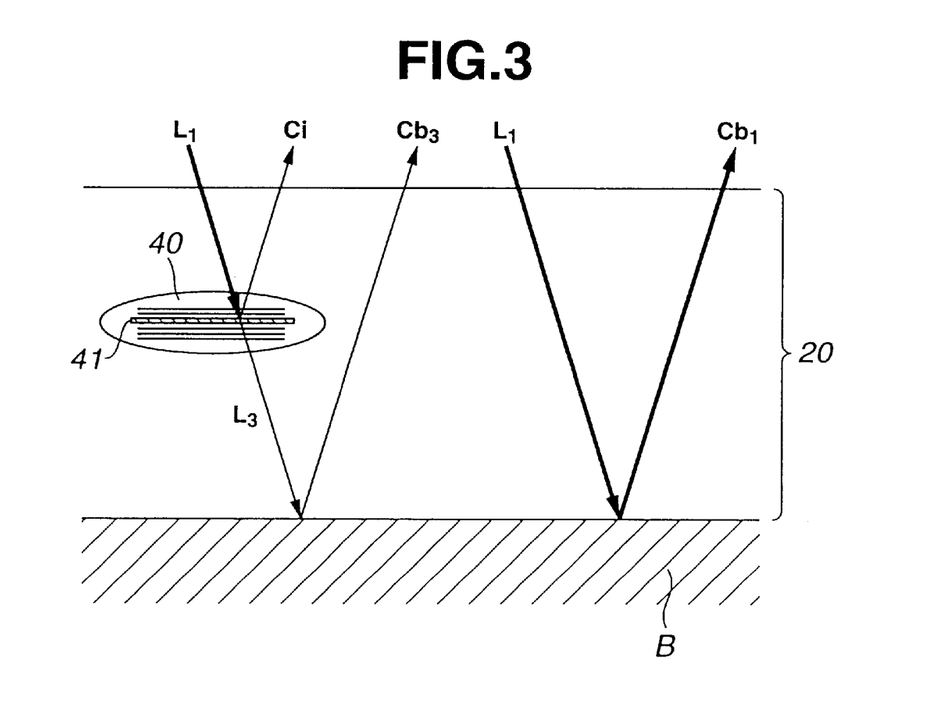
FIG. 3 is a view similar to FIG. 2, showing the coloring mechanism when the brilliant member includes a layer containing a chromatic pigment.

FIG. 3 shows the coating structure and a coloring mechanism thereof, the coating structure including the coating layer 20 containing transparent brilliant members 40 each with a stray-light absorbing layer 41 including a chromatic pigment. The incident light L1 is partly reflected by the brilliant member 40, which forms interference light, providing the interference color Ci. Light other than interference light is absorbed with respect to light of a predetermined wavelength by the stray-light absorbing layer 41 including the chromatic pigment, and the remainder of which forms transmitted light L3. The transmitted light L3 is partly absorbed with respect to light of a predetermined wavelength by the chromatic pigment of the color base B, but mostly reflected thereby, providing an object color Cb3. The light L1 directly incident on the color base B is partly absorbed with respect to light with a predetermined wavelength by the chromatic pigment of the color base B, but mostly reflected thereby, providing the object color Cb1. Generally, we perceive an additive mixture of the three colors with hue slightly influenced by synthesis of interference lights produced by the brilliant members 40.

The use of an achromatic or gray pigment in place of a chromatic pigment enables adjustment of only the intensity of transmitted light without changing the wavelength thereof.

Figure 4A:
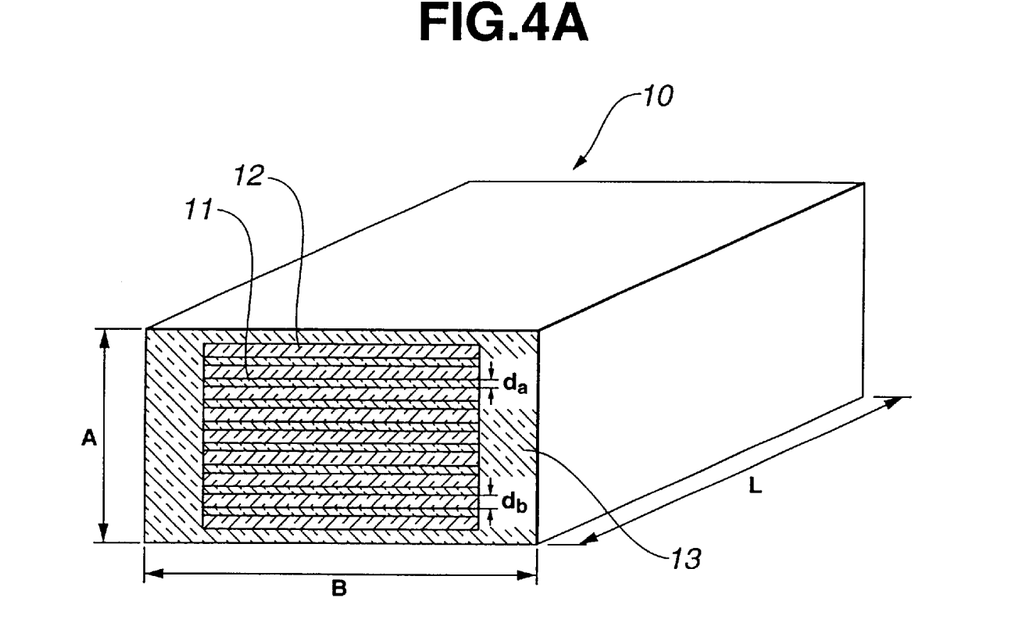
FIGS. 4A–B are perspective views each showing the shape and structure of the brilliant member.
Figure 4B:
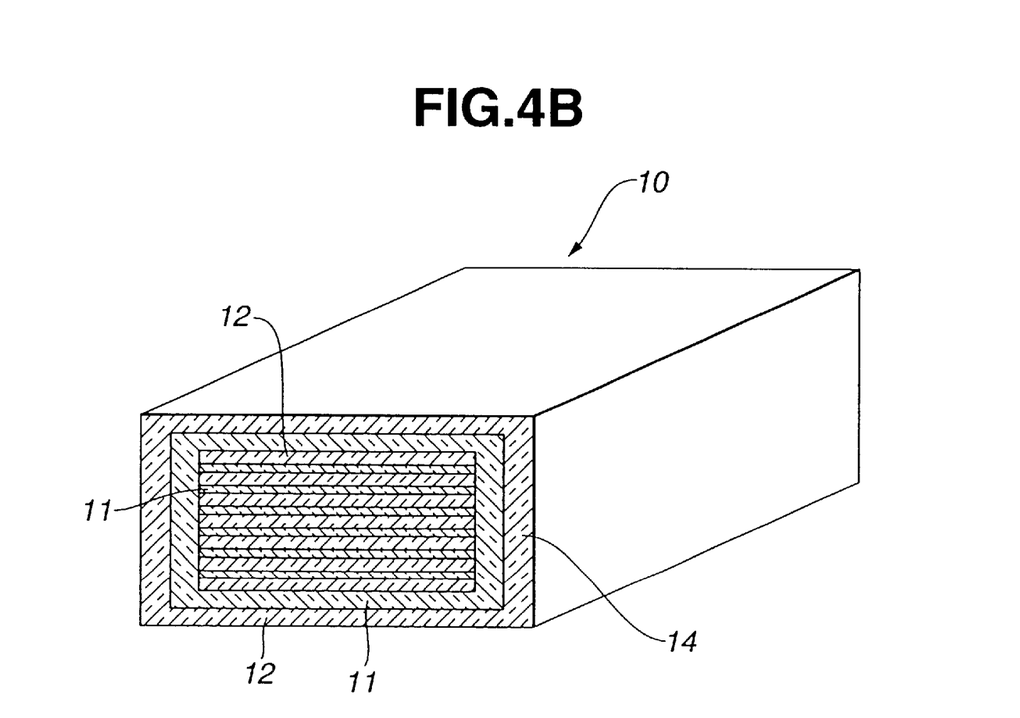

Referring to FIG. 4A, though the outer structure of brilliant member is not limited to a specific structure, it includes, preferably, a clad 13 arranged around the alternate lamination of the two polymers 11, 12 and including one of the polymers 11, 12 or a third polymer different therefrom in view of prevention of peeling of the alternate lamination and improvement in wear resistance and mechanical strength thereof. Alternatively, referring to FIG. 48, a double clad 14 may be arranged, which includes a combination of the polymers 11, 12, i.e. the first polymer 11 and the second polymer 12 arranged therearound.

The shape of the brilliant member is determined, preferably, as depicted, for example, in claim 6, such that the brilliant member is of a substantially rectangular section as shown in FIG. 4A, wherein suppose that a length A of a side of the section perpendicular to the surface of the alternate lamination is 1, a length B of a side of the section parallel to the surface is between 0.8 and 25.0, and a length L of the brilliant member is between 0.8 and 250.0. This allows full achievement of the coloring effect due to reflection and interference of light without deteriorating the productivity of the brilliant members and the coating ability of the paint. Specifically, if the ratio of the length B to the length A, and the ratio of the length L to the length A are both smaller than 0.8, the brilliant member has a high probability that the coloring surface falls to point upward when forming on a work a coating film containing the brilliant members, i.e. the surface of the alternate lamination fails to point in the direction of light when coated on a work, resulting in insufficient coloring effect due to reflection and interference of light. If the ratio of the length B to the length A is greater than 25, there will arise a problem during manufacture of the brilliant members, resulting in impossible stable acquisition of the brilliant members for producing reflection of light of a predetermined wavelength. If the ratio of the length L to the length A is greater than 250, a spray gun may be clogged with the brilliant members during coating, resulting in impossible implementation of normal coating.

In view of the reflection and interference effect and the coating performance, the content of the brilliant members in the coating structure is determined, as depicted, for example, in claim 7, such that the coating layer contains 0.1–30.0% brilliant members by weight. Specifically, if the content of the brilliant members is smaller than 0.1%, few coloring elements exist in the coating film, resulting in difficult achievement of a hue varying with the angle, depth and profundity. On the other hand, if the content is greater than 30%, the pigment concentration exceeds a conventionally set value, having a tendency to exert a bad influence on the properties of the coating film such as spread performance.

The inventive coating structure is formed, preferably, as depicted, for example, in claim 2, such that the first coating layer containing the brilliant members is placed on the color base, and a second or clear coating layer is placed on the first coating layer. This allows an improvement in brilliancy and durability of the coating surface. Moreover, the inventive coating structure can be formed, as depicted in claim 8, such that two coating layers containing first and second brilliant members having different lengths are placed on the color base, the second brilliant members of the upper coating layer being greater in length than the first brilliant members of the lower coating layer. This allows an improvement in profundity and depth of the entire coating film. Moreover, as depicted in claim 9, a third or clear coating layer is placed on the two coating layers, which contributes to an improvement in brilliancy and durability of the coating surface. Moreover, as depicted in claim 10, a fourth or clear coating layer is interposed between the upper and lower coating layers, which contributes to a further improvement in profundity and depth of the coating film.

As described above, the inventive coating structure provides not only a visual quality with high brilliancy, hue varying with the angle, depth and profundity, but novel design and ornamental qualities, and produces a tone different from a color base that forms a lower layer of a coating film due to coloring interaction therewith. The inventive coating structure finds various applications such as coating on bodies and/or parts of vehicles including a car, a ship and a plane, a furniture, electric appliances, sporting goods, building materials, signboards, and interior and fashion articles.

Figure 5A:
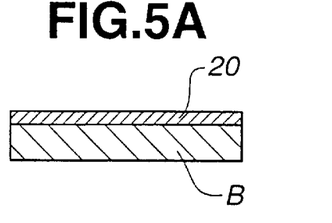
FIGS. 5A–5O are sectional or perspective views showing examples of the coating structure.
Figure 5B:
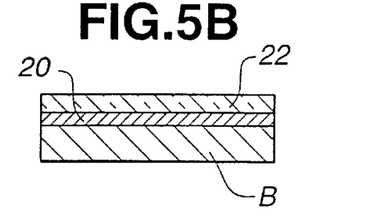
Figure 5C:
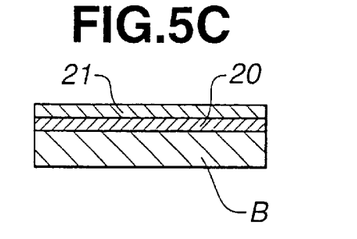
Figure 5D:
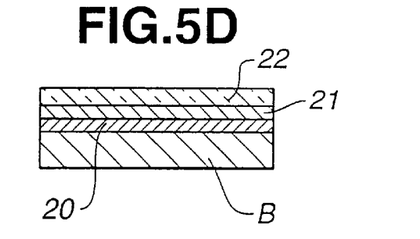
Figure 5E:
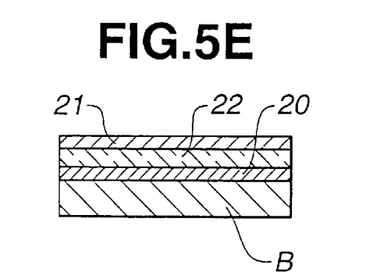
Figure 5F:
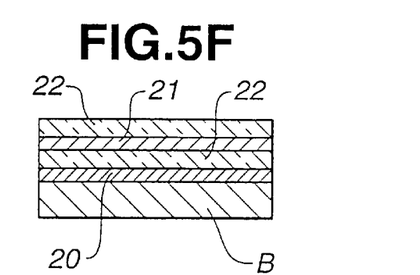
Figure 5G:
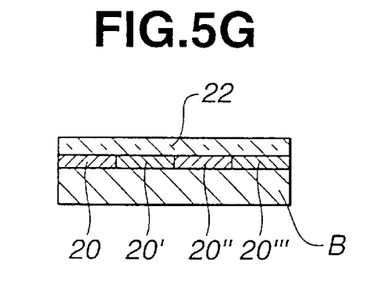
Figure 5H:
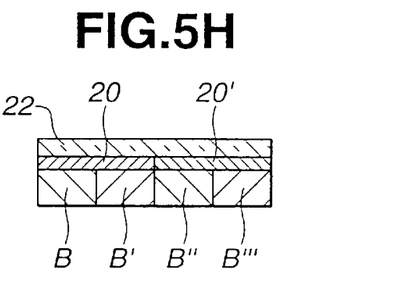
Figure 5I:
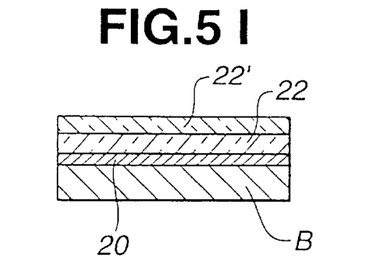
Figure 5J:
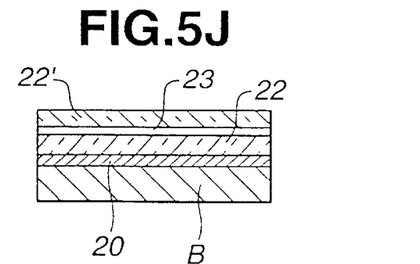
Figure 5K:
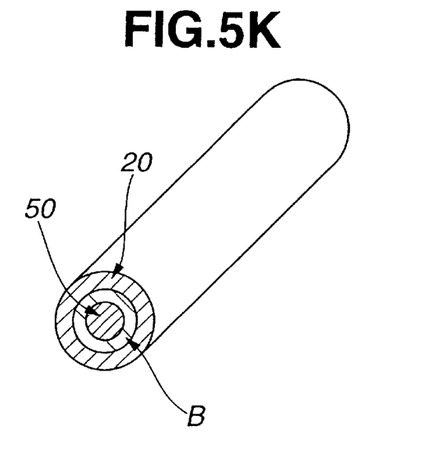
Figure 5L:
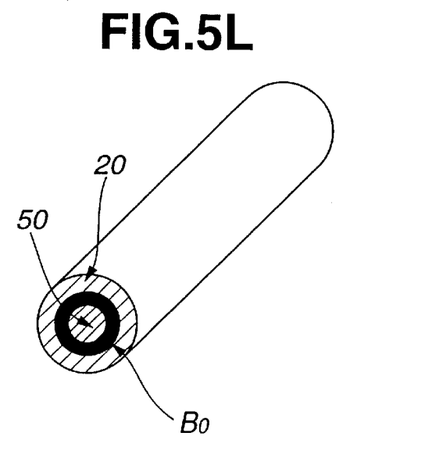
Figure 5M:
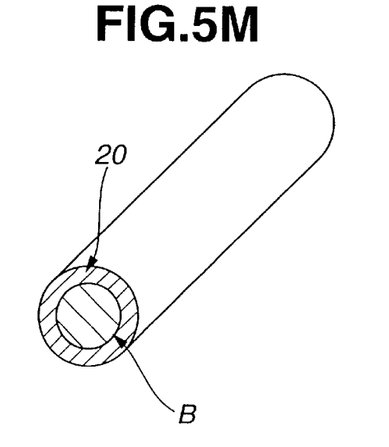
Figure 5N:
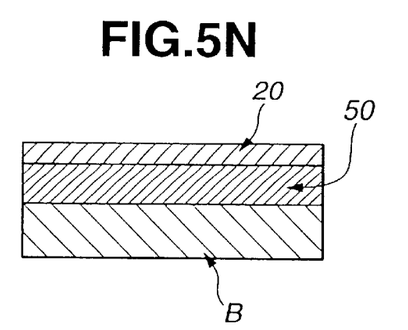
Figure 5O:
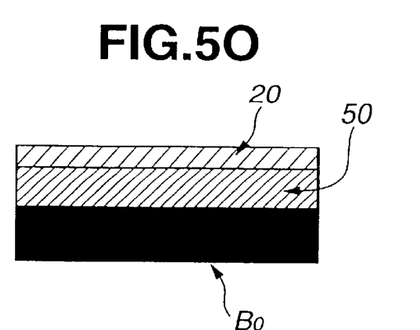

Referring to FIGS. 5A–5O, the inventive coating structure will be described in detail.

Referring to FIG. 5A, the coating structure includes fundamentally the coating layer 20 placed on the color base B and containing transparent brilliant members. Referring to FIGS. 5B, 5D and 5F–5J, a clear coating layer 22 is, preferably, placed on the coating layer 20 in view of an increase in brilliancy and durability of the coating surface.

Referring to FIG. 5C, the coating structure may include two or more coating layers 20, 21 placed on the color base B and containing brilliant members with different lengths, wherein the brilliant member contained in the upper coating layer 21 is longer than that one contained in the lower coating layer 20 to obtain improved depth and profundity of the entire coating film.

Referring to FIG. 5D, the coating structure may further include a clear coating layer 22 on the two coating layers 20, 21 to obtain an improvement not only in depth and profundity of the entire coating film, but in brilliancy of the coating surface. Referring to FIG. 5E, the clear coating layer 22 is interposed between the two coating layers 20, 21 containing brilliant members with different lengths to obtain a further improvement in depth and profundity of the entire coating film.

Referring to FIG. 5F, the coating structure may include another clear coating layer 22 on the structure as shown in FIG. 5E.

FIGS. 5G–5J show variants of the coating structures as shown in FIGS. 5A–5F. Referring to FIG. 5G, the coating layer containing brilliant members may include a plurality of portions 20, 20', 20", 20''' coloring differently or with different contents of the brilliant members. Referring to FIG. 5H, the color base may include a plurality of portions B, B', B", B''' producing several tones with different hues, luminosities or saturations. Referring to FIG. 5I, a plurality of clear coating layers 22, 22' may be placed one upon another to obtain further improved brilliancy. Referring to FIG. 5J, in view of lowering of the adhesion of the clear coating layer when thickened, a transparent base 23 with excellent adhesion may be arranged between the two clear coating layers 22, 22'.

Referring to FIGS. 5K–5L, the coating structure may include an achromatic or chromatic non-planate base material 50 with transparency, a color base B, Bo arranged around the base material 50, and a coating layer 20 containing brilliant members and covering the color base B. By way of example, such coating structure is in the form of a linear structure as shown in FIGS. 5K–5L. The color base B of the coating structure as shown in FIG. 5K has a transparency, whereas the color base Bo of the coating structure as shown in FIG. 5L has no transparency wherein most of incident light is absorbed.

Figure 6A:
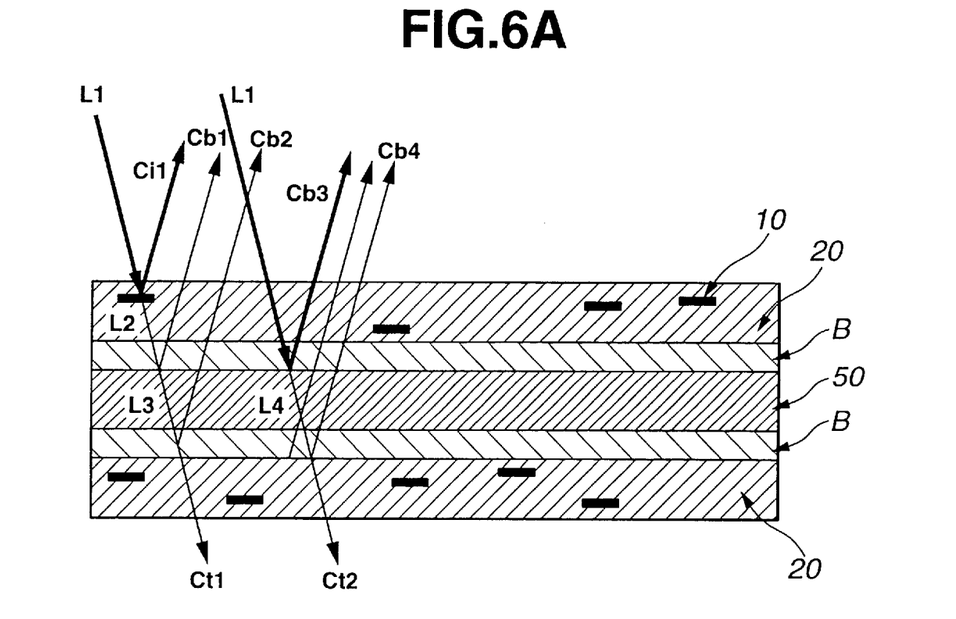
FIGS. 6A–6B are views similar to FIG. 3, showing the optical paths when using a color base with transparency and that one with no transparency.

Referring to FIG. 6A, the optical paths will be described with regard to the coating structure as shown in FIG. 5K. Some optical paths are produced in connection with the brilliant member 10. There are produced an interference color Ci1 resulting from reflection and interference of an incident source spectrum L1 produced by the brilliant member 10 dispersed in the coating layer 20, a first object color Cb1 resulting from action of a source spectrum L2 transmitting through the brilliant member 10 with the first color base B, and a second object color Cb2 resulting from action of a source spectrum L3 transmitting through the first color base B with the second color base B. Other light or spectrum further transmits through the second color base B and the coating layer 20, and goes out of the coating structure as a transmitted light Ct1.

On the other hand, some optical paths are produced irrespectively of the brilliant member 10. There are produced a third object color Cb3 resulting from action of the spectrum L1 with the first color base B, and a fourth object color Cb4 resulting from action of a source spectrum L4 transmitting through the first color base B with the second color base B. Other light or spectrum further transmits through the second color base B and the coating layer 20, and goes out of the coating structure as a transmitted light Ct2.

Various optical paths exist in such a way, obtaining a peculiar hue change. Moreover, due to contribution of the transmitted lights Ct1, Ct2, a hue change depends on whether or not the coating structure is seen from the side of the spectrum L1.

When the base material with transparency is colored or includes a transparent colored layer, the colored layer absorbs incident light, resulting in excellent achievement of deepened color and visual quality with profundity in view of the visual optics.

Figure 6B:
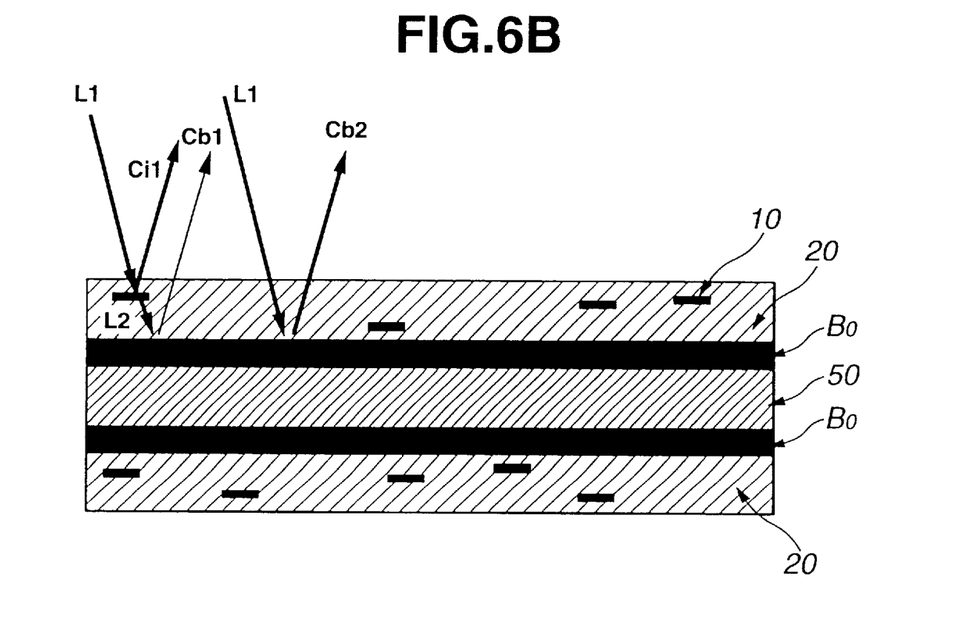

Referring to FIG. 6B, the optical paths of the coating structure as shown in FIG. 5L correspond to those of the coating structure as shown in FIG. 1A.

FIG. 5M shows a variant of the coating structure as shown in FIGS. 5K–5L wherein the base material with transparency includes a color base B.

Referring to FIGS. 5N–5O, the coating structure may include an achromatic or chromatic base material 50 with transparency, a color base B, Bo placed on one side of the base material 50, and a coating layer 20 placed on another side of the base material 50. The color base B of the coating structure as shown in FIG. 5N has a transparency, whereas the color base Bo of the coating structure as shown in FIG. 5O has no transparency wherein most of incident light is absorbed. The coating structures as shown in FIGS. 5N–5O produce complex optical paths in the same way as those as shown in FIGS. 5K–5L.

The optical paths will be described with regard to the coating structure as shown in FIG. 5M. Some optical paths are produced in connection with the brilliant member 10. There are produced an interference color Ci1 resulting from reflection and interference of an incident source spectrum L1 produced by the brilliant member 10 dispersed in the coating layer 20, and a first object color Cb1 resulting from action of the spectrum L1 transmitting through the brilliant member 10 with the firstcolor base B. Other light or spectrum goes out of the coating structure as a transmitted light Ct1.

On the other hand, some optical paths are produced irrespectively of the brilliant member 10. There is produced a second object color Cb2 resulting from direct action of the spectrum L1 with the color base B. Other light or spectrum goes out of the coating structure as a transmitted light Ct2. Due to contribution of the transmitted lights Ct1, Gt2, a hue change depends on whether or not the coating structure is seen from the side of the spectrum L1.

The optical paths of the coating structure as shown in FIG. 5N correspond to those of the coating structure as shown in FIG. 1A.

The inventive coating structure will be described concretely with regard to Examples 1–13 and Comparative Examples 1–3.

EXAMPLE 1

Referring to FIGS. 4A and 5A, using polyethylene naphthalate (PEN) of 1.63 refractive index as the first polymer 11 and nylon 6 of 1.53 refractive index as the second polymer 12, the alternate lamination of the polymers 11, 12 of 30 layers each is formed, which is surrounded by the clad 13 of PEN. Thus, the brilliant member 10 as shown in FIG. 4A is obtained, wherein the thickness da of the first polymer 11 is equal to 0.072 $\mu$m, and the thickness db of the second polymer 12 is equal to 0.077 $\mu$m. The dimensional ratio of the brilliant member 10 is determined such that suppose that the length A of the side perpendicular to the surface of the alternate lamination of the polymers 11, 12 is 1, the length B of the side parallel to the surface is between 4 and 5, and the length L is between 15 and 20.

A paint is prepared by mixing the brilliant members 10 in a two-liquid acrylic-urethane base paint known under the trade name of "R-241 Base" manufactured by NIPPON BEE CHEMICAL, CO., LTD. to have 10 weight % with respect to the entire coating film. The paint prepared in such a way is diluted with an acrylic-urethane thinner known under the trade name of "T-801 Thinner" manufactured, by NIPPON BEE CHEMICAL, CO., LTD. to have an about 11–12 sec. viscosity in terms of Ford cup #4. The diluted paint is applied on a plate of black acrylonitrile-butadiene-styrene (ABS) resin as the color base B cleaned with isopropyl alcohol to have a 15–20 $\mu$m thickness, which is subjected to baking during 20 min. at 80° C. to form the coating layer 20, obtaining the coating structure as shown in FIG. 5A.

EXAMPLE 2

Referring to FIG. 5B, the coating layer 20 is obtained by applying the paint prepared in the same way as Example 1 on an ABS-resin plate as the color base B. An acrylic-urethane clear paint known under the trade name of "R-246 Clear" manufactured by NIPPON BEE CHEMICAL, CO., LTD. is diluted with the acrylic-urethane thinner to have an about 12–13 sec. viscosity in terms of Ford cup #4. The diluted clear paint is applied on the coating layer 20 in the wet-on-wet way to have a 30–35 $\mu$m thickness, which is subjected to baking during 20 min. at 80° C. to form the clear coating layer 22 on the coating layer 20, obtaining the coating structure as shown in FIG. 5B.

EXAMPLE 3

Referring to FIG. 5C, in the same way as Example 1, the first coating layer 20 containing the brilliant members 10 is formed on an ABS-resin plate as the color base B. Then, in order to have 10 weight % with respect to the entire coating film, the brilliant members 10' are mixed in the two-liquid acrylic-urethane base paint. The brilliant member 10' is formed in the same way as the brilliant member 10 contained in the first coating layer 20 to be greater only in length L than the brilliant member 10, i.e. wherein suppose that the length A of the side perpendicular to the surface of the alternate lamination in 1, the length B of the side parallel to the surface is between 4 and 5, and the length L is between 25 and 35. The paint is diluted with the acrylic-urethane thinner to have an about 11–12 sec. viscosity in terms of ford cup #4, and is applied on the first coating layer 20 to have a 15–20 $\mu$m thickness, which is subjected to baking during 20 min. at 80° C. to form the second coating layer, obtaining the coating structure including two coating layers 20, 21 containing the brilliant members 10, 10' with different lengths as shown in FIG. 5C.

EXAMPLE 4

Referring to FIG. 5D, in the same way as Example 3, the second coating layer 21 is formed on the first coating layer 20. Then, the acrylic-urethane clear paint in Example 2 is applied on the second coating layer 21 in the wet-on-wet way to have a 30–35 µm thickness, which is subjected to baking during 20 min. at 80° C. to form the clear coating layer 22 on the coating layers 20, 21, obtaining the coating structure as shown in FIG. 5D.

EXAMPLE 5

Referring to FIG. 5E, in the same way as Example 2, the first coating layer 20 containing the short brilliant members 10 and the clear coating layer 22 are obtained on an ABS-resin plate as the color base B. Then, the paint containing the long brilliant member 10' in Example 3 is applied on the clear coating layer 22 to have a 15–20 µm thickness, which is subjected to baking during 20 min. at 80° C. to obtain the coating structure including the clear coating layer 22 interposed between the coating layers 20, 21 as shown in FIG. 5E.

EXAMPLE 6

Referring to FIG. 5F, in the same way as Example 5, the first coating layer 20 containing the short brilliant members 10 and the clear coating layer 22 are obtained on an ABS-resin plate as the color base B. The second coating layer 21 containing the long brilliant members 10' is formed on the clear coating layer 22. And the acrylic-urethane clear paint in Example 2 is applied on the second coating layer 21 in the wet-on-wet way to have a 30–35 µm thickness, which is subjected to baking during 20 min. at 80° C. to form another clear coating layer 22 on the second coating layer 21, obtaining the coating structure as shown in FIG. 5F.

EXAMPLE 7

In the same way as Example 1, there is used the brilliant member 10 wherein suppose that the length A of the side perpendicular to the surface of the alternate lamination is 1, the length B of the side parallel to the surface is between 2 and 3, and the length L is between 15 and 20. A paint is prepared by mixing the brilliant members 10 in the two-liquid acrylic-urethane base paint and the acrylic-urethane thinner. The paint is applied on a black ABS-resin plate as the color base B, which is subjected to the same baking to form the coating layer 20, obtaining the coating structure as shown in FIG. 5A.

EXAMPLE 8

In the same way as Example 1, there is used the brilliant member 10 wherein suppose that the length A of the side perpendicular to the surface of the alternate lamination is 1, the length B of the side parallel to the surface is between 4 and 5, and the length L is between 1 and 3. A paint is prepared by mixing the brilliant members 10 in the two-liquid acrylic-urethane base paint and the acrylic-urethane thinner. The paint is applied on a black ABS-resin plate as the color base B, which is subjected to the same baking to form the coating layer 20, obtaining the coating structure as shown in FIG. 5A.

EXAMPLE 9

In the same way as Example 1, a paint is prepared by mixing the brilliant members 10 in the two-liquid acrylic-urethane base paint to have 1 weight % with respect to the entire coating film. The paint is diluted with the acrylic-urethane thinner to have the same viscosity, which is applied on an ABS-resin as the color base B to have the same thickness. And the same clear paint is applied thereon in the same way as Example 2, which is subjected to the same baking to form the clear coating layer 22, obtaining the coating structure as shown in FIG. 5B.

EXAMPLE 10

In the same way as Example 1, a paint is prepared by mixing the brilliant members 10 in the two-liquid acrylic-urethane base paint to have 28 weight % with respect to the entire coating film. The paint is diluted with the acrylic-urethane thinner to have the same viscosity, which is applied on an ABS-resin as the color base B to have the same thickness. And the same clear paint is applied thereon in the same way as Example 2, which is subjected to the same baking to form the clear coating layer 22, obtaining the coating structure as shown in FIG. 5B.

EXAMPLE 11

Referring to FIG. 4B, using polyethylene terephthalate (PET) and nylon as the first and second polymers 11, 12, the brilliant member 10 is formed, having a rectangular section as shown in FIG. 4B. The brilliant member 10 has a reflection peak wavelength $\lambda$ equal to 0.47 µm (blue), and a dimensional ratio determined such that suppose that the length A of the side perpendicular to the surface of the alternate lamination is 1, the length B of the side parallel to the surface is between 4 and 5, and the length L is between 10 and 15.

A paint is prepared by mixing the brilliant members 10 in the two-liquid acrylic-urethane base paint to have 10 weight % with respect to the entire coating film. The paint is diluted with the acrylic-urethane thinner to have an about 11–12 sec. viscosity in terms of Ford cup #4. The diluted paint is applied on a black ABS-resin plate as the color base B to have a 15–20 µm thickness.

Moreover, the acrylic-urethane clear paint is diluted with the acrylic-urethane thinner to have an about 12–13 sec. viscosity in terms of Ford cup #4. The diluted paint is also applied on the above ABS-resin plate in the wet-on wet way to have a 30–35 µm thickness, which is subjected to baking during 20 min. at 80° C. to form the clear coating layer 22 on the coating layer 20, obtaining the coating structure as shown in FIG. 5B.

EXAMPLE 12

Referring to FIG. 4B, using PET and nylon as the first and second polymers 11, 12, the brilliant member 10 is formed, having a rectangular section as shown in FIG. 4B. The brilliant member 10 has a reflection peak wavelength $\lambda$ equal to 0.52 µm (green), and a dimensional ratio determined such that suppose that the length A of the side perpendicular to the surface of the alternate lamination is 1, the length B of the side parallel to the surface is between 4 and 5, and the length L is between 10 and 15.

Coating is carried out in the same way as Example 11, obtaining the coating structure as shown in FIG. 5B

EXAMPLE 13

Referring to FIG. 4B, using PET and nylon as the first and second polymers 11, 12, the brilliant members 10, 10' are formed, each having a rectangular section as shown in FIG. 4B. The brilliant members 10, 10' each have a reflection peak wavelength $\lambda$ equal to 0.52 µm (green), and a dimensional ratio determined such that suppose that the length A of the side perpendicular to the surface of the alternate lamination is 1, the length B of the side parallel to the surface is between 4 and 5. However, the brilliant members 10, 10' are of different dimensional ratios with respect to the length L, i.e. the lengths L of the two are between 10 and 15 and between 25 and 30, respectively.

In the same way as Example 11, the first coating layer containing the short brilliant members 10 is formed on a black ABS-resin plate as the color base B, on which the clear coating layer 22 is formed. Moreover, the second coating layer 21 containing the long brilliant members 10' is formed on the clear coating layer 22.

Then, the acrylic-urethane clear paint is applied on the second coating layer 21 in the wet-on-wet way to have a 30–35 μm thickness, which is subjected to baking during 20 min. at 80° C. to form the clear coating layer 22 on the second coating layer 21, obtaining the coating structure as shown in FIG. 5F.

COMPARATIVE EXAMPLE 1

A solid red two-liquid acrylic-urethane base paint known under the trade name of "R-241MB BAR2 Base" manufactured by NIPPON BEE CHEMICAL, CO., LTD, is diluted with the acrylic-urethane to have an about 11–12 sec. viscosity in terms of Ford cup #4. The diluted paint is applied on a black ABS-resin plate as the color base B to have a 15–20 μm thickness, forming a normal solid-color coating film with no brilliant member contained. And the same clear paint as that one used in Example 2 is applied thereon in the wet-on-wet way, which is subjected to baking during 20 min. at 80° C. to form the clear coating layer 22, obtaining a coating structure similar to that one as shown in FIG. 5B.

COMPARATIVE EXAMPLE 2

A metallic-silver two-liquid acrylic-urethane base paint known under the trade name of "R-241 BKL0 Base" manufactured by NIPPON BEE CHEMICAL, CO., LTD. is diluted with the acrylic-urethane to have the same viscosity. In the same way as Comparative Example 1, the diluted paint is applied on a black ABS-resin plate as the color base B, forming a normal metallic-color coating film with no brilliant member contained. And the same clear paint is applied thereon, which is subjected to the same baking to form the clear coating layer 22, obtaining a coating structure similar to that one as shown in FIG. 5B.

COMPARATIVE EXAMPLE 3

A two-liquid acrylic-urethane base paint known under the trade name of "R-248 BQR2 Base" manufactured by NIPPON BEE CHEMICAL, CO., LTD., and a pearl-white two-liquid acrylic-urethane base paint known under the trade name of "R-241 MB BQR2 Mica Base" manufactured by NIPPON BEE CHEMICAL, CO., LTD. are diluted with the acrylic-urethane thinner to have the same viscosity. In the same way as Comparative Example 1, the diluted mixture is applied on a black ABS-resin plate as the color base B, forming a normal pearl-color coating film with no brilliant member contained. And the same clear paint is applied thereon, which is subjected to the same baking to form the clear coating layer 22, obtaining a coating structure similar to that one as shown in FIG. 5B.

Figure 8:
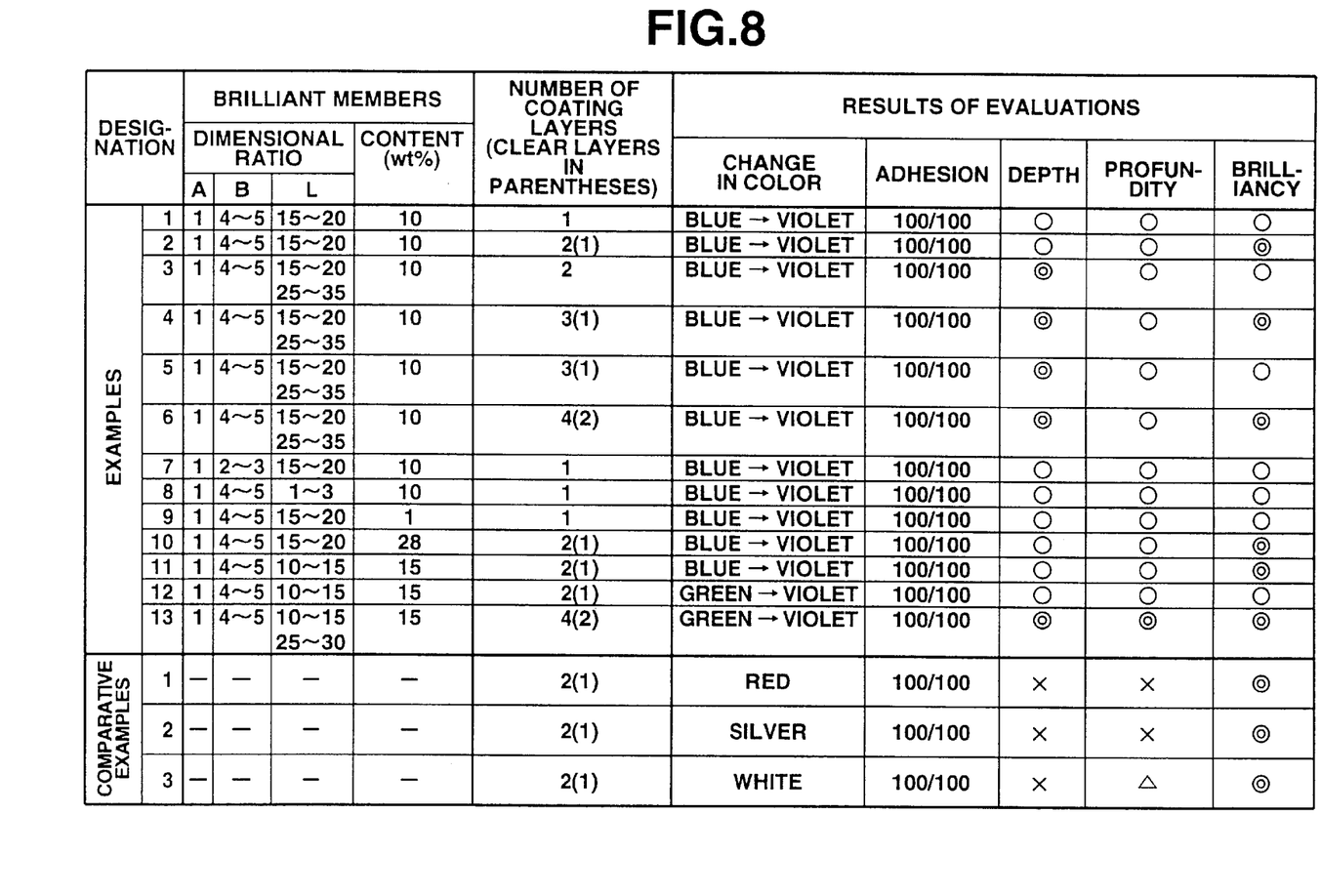
FIG. 8 is a table showing the results of evaluations of the coating structures.

Referring to FIG. 8, the coating structures of Examples 1–13 and Comparative Examples 1–3 are evaluated with regard to the following points. The results of the evaluations are given in Table in FIG. 8.

1) Change in Color

A varied-angle colorimeter of GCMS-4 Type manufactured by MURAKAMI COLOR RESERCH LABORATORY is used and fixed so that light is incident thereon at 0° angle or perpendicularly with respect to the surface of a sample. The spectral reflectances of lights acting at +15° and +60° angles are measured in a 390–730 nm wavelength range and at a 10 nm pitch. The color is evaluated based on an XYZ value.

2) Adhesion of the Coating Film

After formed, the coating film is subjected to a 240 hr. load in the environment of 50° C. temperature and 95% relative humidity, which is left standing during 24 hr. at an ambient temperature. The coating film is evaluated by the cross-cut adhesion test stipulated in Japanese Industrial Standards (JIS), K5400. The result of evaluation is given by the number of remaining ones of the 100 cross cut pieces after the adhesion test.

3) Depth

The depth is pertinent to a feel induced with respect to the accommodative amounts of focus of two eyes when straightly observing points placed on the same plane. In the present invention, the depth is evaluated by a method introduced in the paper entitled "Depth Perception and Accommodation of The Human Eye" published at the 5th Symposium on Human Interface held on Oct. 25–27, 1989 in Kyoto.

Specifically, using an open front-face infrared optometer having the measuring range of −10 to 10 diopter, the measuring accuracy of 0.05 diopter, the front visual field of 40° in the horizontal direction and 25° in the vertical or upward direction and the infrared wavelength of 880 nm, the depth is evaluated based on a physiological response of 5 male subjects of 20–30 years with normal eyesight. In order to make constant the visual field of the subject as far as possible, the observation is carried out with a right eye and under 100–200 lux background lighting. Calling subject's attention to two points, i.e. the surface of the coating flim and a brilliant point appearing thereabove, the accommodative amount of an eyeball is measured when looking at eachpoint. The accommodative amount of the eyeball with respect to the two points is measured 2 or 3 times during continuous 10–15 sec. for every measurement to obtain an average of accommodative data during 1 sec. In such a way, 15 measurements are carried out with respect to each point. And it is checked based on the "t" or Welch's statistical test whether or not a difference between the accommodative amounts of the eyeball is significant When looking at the two points. If the difference is significant, it is evaluated that the depth is effective or existing. It is noted that in Table in FIG. 8, the cell with x designates that the depth is not effective, the cell with ○ designates that the depth is effective, and the cell with ⊚ designates that the depth is highly effective.

4) Profundity

The profundity is pertinent to a feel induced with respect to a hue and a lightness and influenced, particularly, by low-lightness and low-saturation factors. In the present invention, the profundity is evaluated in changing a hue, a lightness, and a saturation that constitute the three attributes of the color. Specifically, using the same device and in the same way as the evaluation of the depth, the profundity is evaluated visually by the 5 male subjects. It is noted that in Table in FIG. 8, the cell with x designates that the profundity is not effective, the cell with Δ designates that the profundity is slightly effective, the cell with ○ designates that the profundity is effective, and the cell with ⊚ designates that the profundity is highly effective.

5) Brilliancy

In the same way, the brilliancy is evaluated visually by the 5 male subjects. It is noted that in Table in FIG. 8, the cell with ○ designates that the brilliancy is effective, and the call with ⊚ designates that the brilliancy is highly effective.

As is apparent from the results given in Table in FIG. 8, in Examples 1–6 regarding the coating structure including the coating layer 20 that includes the alternate lamination of the polymers with different refractive indexes and contains the brilliant members 10 with a predetermined dimensional ratio, the coating structure including the first coating layer 20 and the second coating layer 21 that contains the brilliant members 10' longer than the brilliant members 10, and the coating structure including the first and second coating layers 20, 21 and the clear coating layer 22, each coating structure provides not only a novel visual quality with hue changing from blue to violet with the angle, depth and profundity, and also provides an excellent adhesion. It is confirmed, in particular, that the coating structures in Examples 2, 4, 6 and 9 with the clear coating layer 22 formed in the outermost surface are of excellent brilliancy, and that the coating structures in Examples 3–6 and 13 with the two coating layers 20, 21 containing the brilliant members 10, 10' with different lengths are of very excellent depth. Regarding the coating structures in Examples 7–8 with the dimensional ratios with respect to the side B parallel to the surface of the alternate lamination and the length L are rather small, and that one in Example 9 with relatively small content of the brilliant members 10, it is confirmed that they attain target levels of hue change, depth and profundity, which are, however, rather poor as compared with the other Examples due to insufficient reflection and interference produced by the brilliant members 10. Regarding the coating structure in Example 10 with relatively large content of the brilliant members 10, it is confirmed that it is excellent in hue change, depth and profundity, but slightly inferior in coating ability and adhesion as compared with the other Examples.

Regarding the coating structures in Comparative Examples 1–3 with conventional solid-color, metallic-color, and pearl-color coating films, it is confirmed that the coating structure in Comparative Example 3 provides a slight profundity, but neither a depth nor a hue change.

Next, the inventive coating structure including a stray-light absorbing layer will be described with regard to Examples 14–15.

EXAMPLE 14

Figure 7:
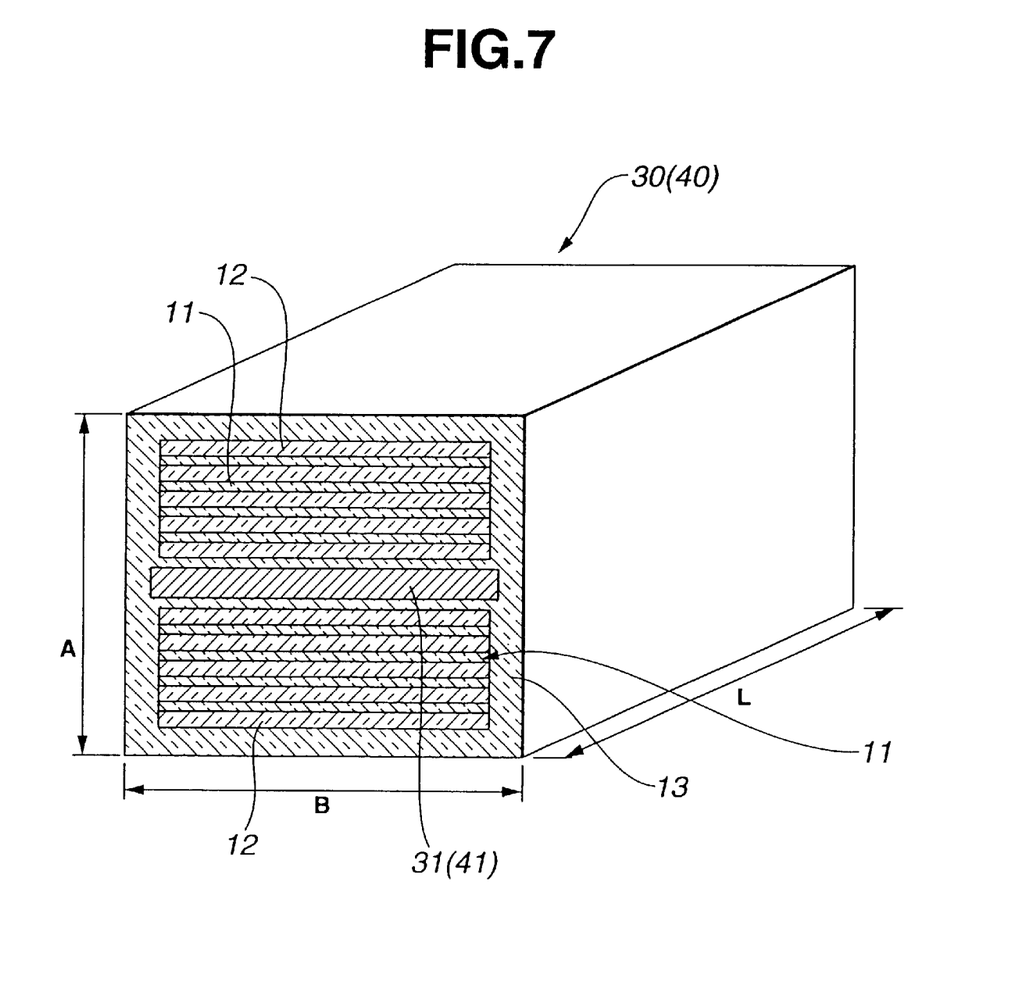
FIG. 7 is a view similar to FIG. 4B, showing the shape and structure of the brilliant member that includes a stray-light absorbing layer containing a pigment.

Referring to FIG. 7, using PEN of 1.63 refractive index as the first polymer 11 and nylon 6 of 1.53 refractive index as the second polymer 12, two alternate laminations of the polymers 11, 12 of 15 layers each are formed. A stray-light absorbing layer 31 of nylon 6 containing a black pigment or carbon black and having a 2 $\mu$m thickness is interposed between the two alternate laminations. The ensemble is surrounded by the clad 13, of PEN, obtaining the brilliant member 30 as shown in FIG. 7. In order to obtain a target peak wavelength of 0.47 $\mu$m (blue) at 0° incident angle and 0° acting angle, it is determined that the thicknesses of the first and second polymers 11, 12 are 0.072 and 0.077 $\mu$m, and the thickness of the clad 13 is 2 $\mu$m. Moreover, the dimensional ratio of the brilliant member 30 is determined such that suppose that the length A of the side perpendicular to the surface of the alternate lamination of the polymers 11, 12 is 1, the length a of the side parallel to the surface is between 4 and 5, and the length L is between 15 and 20.

A paint is prepared by mixing the brilliant members 30 in a two-liquid acrylic-urethane base paint known under the trade name of "R-241MB Base" manufactured by NIPPON BEE CHEMICAL, CO., LTD. to have 10 weight % with respect to the entire coating film. The paint is diluted with the acrylic-urethane thinner to have an about 11–12 sec viscosity in terms of Ford cup #4. The diluted paint is applied on a red-pigment or red-oxide layer formed on a black ABS-resin plate as the color base B to have a 15–20 $\mu$m thickness, which is subjected to baking during 20 min. at 80° C. to form the coating layer 20, obtaining the coating structure as shown in FIG. 5A.

With the coating structure, referring to FIG. 2, the white incident light L1 produces the blue interference color Ci due to the upper alternate lamination of the brilliant member 30. Light transmitted through the upper alternate lamination is all absorbed by the stray-light absorbing layer 31. The white light L1 directly incident on the color base B without striking the brilliant member 30 produces a red color or the object color Cb1 due to red oxide contained in the color base B. Thus, we perceive the dotted blue interference color Ci in the red object color Cb1.

A reduction in the amount of addition of carbon black to the stray-light absorbing layer 31 produces yellow transmitted light, which strikes the color base B to make a red color of red oxide more vivid.

EXAMPLE 15

Referring to FIG. 7, using the same resins as those in Example 14, two alternate laminations of the polymers 11, 12 of 15 layers each are formed. A stray-light absorbing layer 41 of nylon 6 containing a green pigment or chromium oxide and having a 2 $\mu$m thickness is interposed between the two alternate laminations. The ensemble is surrounded by the clad 13 of PEN, obtaining the brilliant member 40 as shown in FIG. 7 in order to obtain the same target peak wavelength of 0.47 $\mu$m (blue) at 0° incident angle and 0° acting angle, it is determined that the thicknesses of the first and second polymers 11, 12 are 0.072 and 0.077 $\mu$m, and the thickness of the clad is 2 $\mu$m Moreover, the dimensional ratio of the brilliant member 40 is determined such that suppose that the length A of the side perpendicular to the surface of the alternate lamination of the polymers 11, 12 is 1, the length B of the side parallel to the surface is between 4 and 5, and the length L is between 15 and 20.

In the same way as Example 14, a paint is prepared by mixing the brilliant members 40 in the two-liquid acrylic-urethane base, which is diluted with the acrylic-urethane thinner. The diluted paint is applied on a green-pigment or chromium-oxide layer formed on a black ABS-resin plate as the color base B to have a 15–20 $\mu$m thickness, which is subjected to baking during 20 min. at 80° C. to form the coating layer 20, obtaining the coating structure as shown in FIG. 5A.

With the coating structure, referring to FIG. 3, the white incident light L1 produces the blue interference color Ci due to the alternate lamination of the brilliant member 40. The light L3 transmitted through the stray-light absorbing layer 41 of the brilliant member 40 produces a yellow color, which strikes the color base B to change a color of chromium oxide from green to yellow green (the object color Cb3). The white light L1 directly incident on the color base B without striking the brilliant member 40 produces a green color or the object color Cb1 due to chromium oxide contained in the color base B. Thus, we perceive the dotted blue interference color Ci and yellow-green object color Cb3 in the green object color Cb1.

The entire contents of Japanese Patent Application P10-350985 filed on Dec. 10, 1998 and the paper entitled "Depth Perception and Accommodation of The Human Eye" published at the 5th Symposium on Human Interface held on Oct. 25–27, 1989 in Kyoto are incorporated herein by reference.

Although the present invention has been described above by reference to certain embodiments of the present invention, the present invention is not limited to the embodiments described above. Modifications and variations of the embodiments described above will occur to those skilled in the art in light of the above teachings.

What is claimed is:

1. A coating structure, comprising:
    a color base;
    a first coating layer placed on said color base; and
    transparent brilliant members contained in said first coating layer, each brilliant member including an alternate lamination of at least two polymers having different refractive indexes, each brilliant member controlling interference light resulting from reflection and interference produced by said alternate lamination and transmitted light other than said interference light,
        whereby the coating structure is provided with a coloring mechanism for producing at least an interference color resulting from reflection and interference of an incident source spectrum produced by said brilliant members, a first object color resulting from direct action of said spectrum with said color base, and a second object color resulting from action of said spectrum transmitting through said brilliant members with said color base, mixing of said colors providing a hue varying with an angle.

2. A coating structure as claimed in claim 1, further comprising:
    a second coating layer placed on said first coating layer, said second coating layer being a clear layer.

3. A coating structure as claimed in claim 2, wherein said brilliant members are dispersed in said first coating layer, and are spaced to allow direct incidence of said spectrum to said color base and direct outgoing of said spectrum reflected by said color base.

4. A coating structure as claimed in claim 3, wherein said alternate lamination of each brilliant member includes a layer containing one of an achromatic or chromatic coloring matter.

5. A coating structure as claimed in claim 4, wherein each brilliant member includes a clad arranged therearound, said clad being formed out of one of said two polymers, a polymer other than said two polymers, and a combination of said polymers.

6. A coating structure as claimed in claim 5, wherein each brilliant member is of a substantially rectangular section, wherein a ratio of the length of a side of said section perpendicular to a surface of said alternate lamination to the length of a side of said section parallel to said surface of said alternate lamination is 1:0.8–25.0, and said ratio of the length of said side of said section to the length of each brilliant member is 1:0.8–250.0.

7. A coating structure as claimed in claim 6, wherein each coating layer contains 0.1–30.0% brilliant members by weight.

8. A coating structure, comprising:
    a color base;
    first and second layers placed on said color base, said first layer being adjacent to said color base; and
    first and second transparent brilliant members contained in said first and second layers, each brilliant member including an alternate lamination of at least two polymers having different refractive indexes, each brilliant member controlling interference light resulting from reflection and interference produced by said alternate lamination and transmitted light other than said interference light, said second brilliant members being greater in length than said first brilliant members,
        whereby the coating structure is provided with a coloring mechanism for producing at least an interference color resulting from reflection and interference of an incident source spectrum produced by said first and second brilliant members, a first object color resulting from direct action of said spectrum with said color base, and a second object color resulting from action of said spectrum transmitting through said first and second brilliant members with said color base, mixing of said colors providing a hue varying with an angle.

9. A coating structure as claimed in claim 8, further comprising:
    a third layer placed on said second layer, said third layer being a clear layer.

10. A coating structure as claimed in claim 9, further comprising:
    a fourth layer interposed between said first and second layers, said fourth layer being a clear layer.

11. A coating structure as claimed in claim 10, wherein said first and second brilliant members are dispersed in said first and second layers, and are spaced to allow direct incidence of said spectrum to said color base and direct outgoing of said spectrum reflected by said color base.

12. A coating structure as claimed in claim 11, wherein said alternate lamination of each brilliant member includes a layer containing one of an achromatic or chromatic coloring matter.

13. A coating structure as claimed in claim 12, wherein each brilliant member includes a clad arranged therearound, said clad being formed out of one of said two polymers, a polymer other than said two polymers, and a combination of said polymers.

14. A coating structure as claimed in claim 13, wherein each brilliant member is of a substantially rectangular section, wherein a ratio of the length of a side of said section perpendicular to a surface of said alternate lamination to the length of a side of said section parallel to said surface of said alternate lamination is 1:0.8–25.0, and said ratio of the length of said side of said section to the length of each brilliant member is 1:0.8–250.0.

15. A coating structure as claimed in claim 14, wherein each coating layer contains 0.1–30.0% brilliant members by weight.

* * * * *